United States Patent
Miller et al.

(10) Patent No.: US 9,292,119 B2
(45) Date of Patent: *Mar. 22, 2016

(54) DISPLAY DEVICES AND METHODS FOR DETECTING USER-INTENDED TOUCH INPUT

(71) Applicant: International Business Machines Corporation, Armonk, NY (US)

(72) Inventors: Duane S. Miller, Wake Forest, NC (US); Robert T. Noble, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/449,256

(22) Filed: Aug. 1, 2014

(65) Prior Publication Data

US 2014/0340346 A1 Nov. 20, 2014

Related U.S. Application Data

(63) Continuation of application No. 13/477,027, filed on May 21, 2012, now Pat. No. 8,902,183.

(51) Int. Cl.
*G06F 3/041* (2006.01)
*G06F 3/042* (2006.01)

(52) U.S. Cl.
CPC ............ *G06F 3/0414* (2013.01); *G06F 3/0416* (2013.01); *G06F 3/0418* (2013.01); *G06F 3/0421* (2013.01); *G06F 2203/04105* (2013.01)

(58) Field of Classification Search
CPC ... G06F 3/0414; G06F 3/0416; G06F 3/0421; G06F 3/0418; G06F 2203/04105
See application file for complete search history.

(56) References Cited

U.S. PATENT DOCUMENTS

| | | |
|---|---|---|
| 6,198,362 B1 | 3/2001 | Harada et al. |
| 7,337,085 B2 | 2/2008 | Soss |
| 7,567,240 B2 | 7/2009 | Peterson, Jr. et al. |
| 7,683,894 B2 | 3/2010 | Kent |
| 8,018,440 B2 | 9/2011 | Townsend et al. |
| 8,050,876 B2 | 11/2011 | Feen et al. |
| 8,059,107 B2 | 11/2011 | Hill et al. |

(Continued)

OTHER PUBLICATIONS

Christopher et al., "Statistically Based Adaptive Threshold," IBM TDB n11 04-90 p. 210-211, Apr. 1, 1990, IP.com No. IPCOM000100406D.

(Continued)

*Primary Examiner* — Sahlu Okebato
(74) *Attorney, Agent, or Firm* — Olive Law Group, PLLC

(57) ABSTRACT

Display devices and methods for detecting user-intended touch input are provided. An example display device includes a touch-sensitive display. Further, the display device includes an impact sensor attached to the touch-sensitive display and configured to generate a signal representative of an impact of the touch-sensitive display. The display device also includes a computing device configured to receive the signal. The computing device is also configured to detect a peak of the signal. Further, the computing device is configured to determine whether a rising edge of a magnitude of the peak detected signal meet predetermined criteria. The computing device is also configured to indicate detection of user-intended touch in response to determining that the predetermined criteria are met.

22 Claims, 9 Drawing Sheets

(56) References Cited

U.S. PATENT DOCUMENTS

| | | |
|---|---|---|
| 8,130,202 B2 | 3/2012 | Levine et al. |
| 2008/0158169 A1 | 7/2008 | O'Connor et al. |
| 2008/0231612 A1* | 9/2008 | Hill et al. .................. 345/177 |
| 2010/0177057 A1 | 7/2010 | Flint et al. |
| 2010/0321104 A1* | 12/2010 | Busch ..................... 327/552 |
| 2011/0115729 A1 | 5/2011 | Kremin et al. |
| 2011/0291948 A1 | 12/2011 | Stewart et al. |

OTHER PUBLICATIONS

Office Action dated Mar. 31, 2014 for U.S. Appl. No. 13/477,027, titled "Display Devices and Methods for Detecting User-Intended Touch Input".

Notice of Allowance and Fee(s) Due dated Jul. 24, 2014 for U.S. Appl. No. 13/477,027, titled "Display Devices and Methods for Detecting User-Intended Touch Input".

* cited by examiner

DISPLAY DEVICES AND METHODS FOR DETECTING USER-INTENDED TOUCH INPUT

CROSS REFERENCE TO RELATED APPLICATION

This application is a continuation application of U.S. patent application Ser. No. 13/477,027, filed May 21, 2012; the entire content of which is incorporated herein by reference in its entirety.

BACKGROUND

1. Field of the Invention

The present invention relates to display devices, and more specifically, to display devices for detecting user-intended touch input.

2. Description of Related Art

Touch screens are touch sensitive display devices that act as both an input device and an output device by incorporating a computer display with a sensor such that information may be displayed and received on the same screen. Touch screens are commonly incorporated into general purpose computers, computer terminals, electronic and computerized appliances, computerized kiosks, personal digital assistants (PDAs), smart phones, and other portable electronic devices. Touch screens are particularly suited for devices where portability, simplicity, and/or durability are important.

There are a number of different types of touch screen technologies. Example touch screens include, but are not limited to, resistive, surface acoustic wave, capacitive, infrared, optical imaging, dispersive signal, and acoustic pulse touch screens. Typically, touch screen devices will detect a touch event, determine coordinates of the touch event on the screen, and report the coordinates to an operating system (OS) by a suitable data communications technique. In an example, the coordinates may be reported to a user interface manager or other suitable application residing on a computing device.

In some instances, unintentional touches may be detected by the touch screen and reported as a touch event. For example, clothing articles, jewelry, keys, water droplets, or insects may cause a touch event such that an unintentional touch event and coordinates are reported. Touches by such objects may meet criteria for a touch event, but they were not intended touches by the user. Although these conditions may be infrequent, they may be annoying to a user and counter-productive. For at least this reason, it is desired to provide improved techniques for accurately recognizing touch intended by a user of a touch screen display device.

BRIEF SUMMARY

In accordance with one or more embodiments of the present invention, display devices and methods for detecting user-intended touch input are provided. An example display device includes a touch-sensitive display having a suitable touch screen technology. Further, the display device includes an impact sensor attached to the touch-sensitive display and configured to generate a signal representative of impact to the touch-sensitive display. The display device also includes a computing device configured to receive the signal. The computing device is also configured to detect a peak value of the signal. Further, the computing device is configured to determine whether a rising edge of the magnitude of the peak detected signal meets predetermined criteria. The computing device is also configured to indicate detection of user-intended touch in response to determining that the predetermined criteria are met.

In accordance with one or more embodiments of the present invention, an example method includes generating a signal representative of an impact to a touch-sensitive display. The method also includes detecting a peak value of the signal. Further, the method includes determining whether a rising edge of the magnitude of the peak detected signal meets predetermined criteria. The method also includes indicating detection of user-intended touch in response to determining that the predetermined criteria are met.

DETAILED DESCRIPTION

Figure 1:
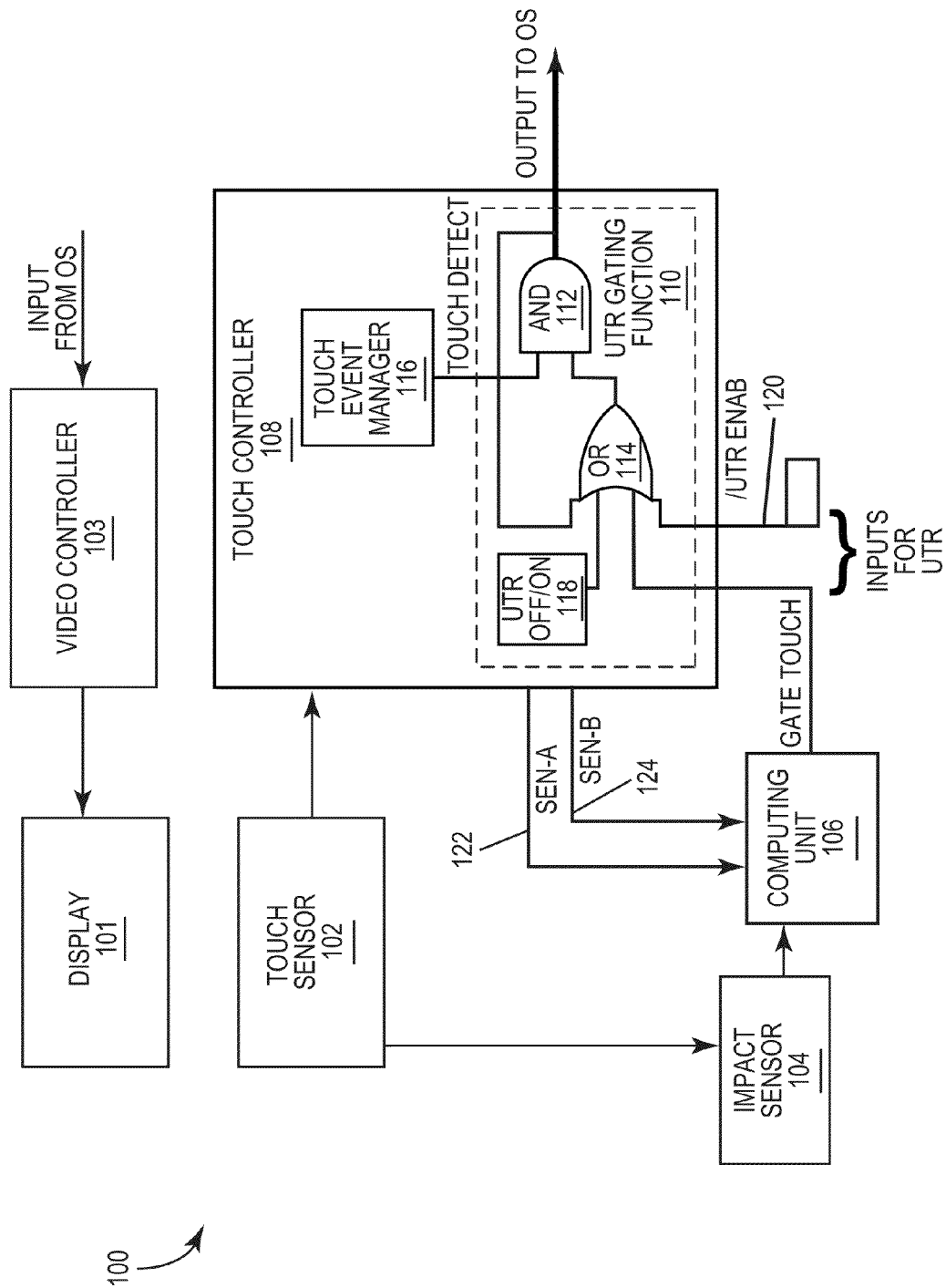
FIG. 1 is a block diagram of an example display device in accordance with embodiments of the present invention.

In describing the exemplary embodiments of the present invention illustrated in the drawings, specific terminology is employed for the sake of clarity. However, the present invention is not intended to be limited to specific terminology so selected, and it is to be understood that each specific element includes all technical equivalents which operate in a similar manner.

FIG. 1 illustrates a block diagram of an example display device 100 in accordance with embodiments of the present invention. Referring to FIG. 1, the display device 100 includes a display 101 configured to display images on a display area. A video controller 103 may receive control signaling from an operating system for controlling the display 101 to display images. Further, the display device 100 includes a touch sensor 102 configured to detect the presence and coordinates of a touch within the display area of the display 101. The touch sensor 102 may include a transparent touch surface and may be placed over the display 101 such that the user may visually coordinate the touch location with the display images. However, the touch sensor 102 may also be located separately from the display 101 similar to a tablet application. The display 101 may be, for example, a liquid crystal display (LCD) to display images. Alternatively, the display 101 may be any other suitable display technology such as, but not limited to, a cathode ray tube (CRT) monitor, an organic light-emitting diode (OLED) display, or a plasma display panel (PDP). A user of the display device 100 can touch the corresponding display area of the touch sensor 102 with his or her finger or other physical device to input a command. Such contact of the display area by the user may be a touch intended by the user and detected by the touch sensor 102 for inputting a command in accordance with embodiments of the present disclosure. Various other touches or contact of the display area of the touch-sensitive display 102 may cause unintended touches to be registered by the touch sensor 102. Such unintended touches may be ignored by the display device 100 in accordance with embodiments of the present disclosure.

A transparent plate may be mounted in front of or behind the touch sensor 102 or otherwise an integral part of the touch sensor 102. The transparent plate may be, for example, glass, plastic, or crystal. The transparent plate may serve to protect the display, for example, when the touch screen is used in a public setting or under adverse conditions. Further, the transparent plate may be mounted in such a way as to allow the plate to vibrate or otherwise move. Accordingly, the transparent plate may be mounted such that vibrations are not overly dampened.

In an example, a set of x-axis infrared emitters may be mounted above the transparent plate. Accordingly, from the perspective of a user facing the touch sensor 102, the x-axis infrared emitters may occupy a plane closest to the user, the transparent plate may occupy a plane behind the x-axis infrared emitters and the display device may occupy a plane behind the transparent plate. A set of x-axis infrared sensors, corresponding to the x-axis infrared emitters, may be mounted on substantially the same plane as the x-axis infrared emitters. Accordingly, light emanating from the x-ray infrared emitters may be detected by a corresponding x-axis infrared sensor.

Similarly, a set of y-axis infrared emitters may be mounted on substantially the same plane as the x-axis emitters and sensors. A corresponding set of y-axis infrared sensors may be mounted on substantially the same plane as the other emitters and sensors. Accordingly, light emanating from the y-axis infrared emitters may be detected by a corresponding y-axis infrared sensor.

The infrared emitters may include a light emitting diode (LED), incandescent light source, or laser diode emitting light within the range of approximating 750 nm through 1 mm. The emitters may also include one or more optical lenses that may focus the infrared light into a narrow beam.

The infrared sensors may include a photo transistors for detecting infrared light. The sensors may also include an infrared lens to block ambient light. The infrared sensors may directly correspond to the infrared emitters. Alternatively, a direct correspondence is not required.

When a user of the display device 100 creates a pointing event by touching a finger or stylus to the transparent plate, infrared light to one or more x-axis sensors and y-axis sensors is blocked. For example, infrared light from a particular x-axis emitter may be blocked from reaching a corresponding x-axis sensor, and infrared light from a particular y-axis emitter may be blocked from reaching a corresponding y-axis sensor.

However, there need not be a one-to-one correlation between emitter and sensor. The emitters (or simply one single emitter) may provide a source of infrared light that is detected by a set of infrared sensors. The sensor data may then be analyzed to detect a blocked area where sensed infrared light is substantially below its unblocked level. Alternatively, the blocking of infrared light caused by the touch event may create an interference pattern on the set of sensors that may be interpreted to localize the touch event. Where only a single infrared emitter is used per axis, the infrared light may be focused into a fan-beam shape or repeatedly swept from one side to the other.

An impact sensor 104, for example, a vibration sensor such as a piezoelectric sensor, may be attached to the touch-sensitive display 100 and detect an impact to the touch-sensitive display 100. For example, the impact sensor 104 may detect the physical contact of user-intended touches of the touch sensor 102, such as when the user intentionally touches the transparent plate for entering a command or making a selection. The impact sensor 104 may be used in conjunction with the touch sensor 102 to determine an intentional touch, since an intentional touch can cause some small but finite impact energy to a protective plate of the display 101. However, the impact sensor 104 may include a vibration sensor (e.g., a piezoelectric device) and may therefore also detect energies caused by surrounding vibrational noise sources, such as compressor motors, fans, hard drives, printers, conveyor belts, and the like. The effect is to negate the effect of determining an intentional touch, unless higher thresholds are selected, which in some cases may be uncomfortable or difficult to manage. The presently disclosed invention provides equipment and techniques to minimize the effects of vibrational noise and therefore increase the accuracy of recognizing intended touches by the user of the display 101.

The impact sensor 104 may be mounted in contact with the transparent plate of the display 101 such that the impact associated with user-intended touch is conducted through the transparent plate to the impact sensor 104. In this way, the impact sensor 104 may be in vibrational communication with the display 101. The impact sensor 104 may also be anchored to a relatively stable portion of the display 101.

The impact sensor 104 may be configured to generate a signal representative of an impact to the protective glass of the touch sensor 102. For example, a magnitude, frequency, and duration of the signal may represent the characteristic nature of user-intended touch or other impact to the protective plate of the touch sensor 102. The signal may be output to a computing unit 106 configured for detecting user-intended touch input in accordance with embodiments of the present invention. As described in more detail in the examples provided herein, the computing unit 106 may receive the signal from the impact sensor 104 and apply a filter to the signal. The computing unit 106 may also determine whether a rising edge of the magnitude of the filtered signal meet predetermined criteria. Further, the computing unit 106 may indicate detection of user-intended touch in response to determining that the predetermined criteria are met. The computing unit 106 may be implemented by any suitable combination of hardware, software, and/or firmware.

Indication of detection of user-intended touch may be communicated to a touch controller 108. The touch controller 108 also receives signals from the touch sensor 102 that indicate a coordinate associated with a touch event. For example, the touch sensor 102 in conjunction with the touch controller 108 may determine a touch event in response to a user intentionally touching the transparent plate to input a command or selection. Further, the touch sensor 102 in conjunction with the touch controller 108 may determine a coordinate associated with the touch event and communicate the touch event and coordinates to the operating system (OS). An unintentional touch event may occur when an unintended object comes in contact with the touch sensor 102, such as clothing articles, jewelry, liquid droplets, insects, and the like may contact. In these instances, the resulting signal characteristics may be similar to intended touches and normal algorithms of the touch controller 108 may not distinguish the event from an intended touch by the user, except for assistance provided by the computing unit 106 as disclosed herein. The impact sensor 104 and computing unit 106 provide a secondary sensing system. This secondary sensing system provides for concurrent detection with the touch sensor 102 and the touch controller 108 such that the computing device 106 confirms a user-intended touch before the touch controller 108 can report a touch event to an operating system or other component of electronic equipment. If the secondary sensing system is enabled, a touch event detected by the touch sensor 102 that does not have a corroboration of a concurrent event from the secondary sensing system would return to look for other events. That is, with the impact sensor 104, the computing unit 106, and the touch controller 108, an unintentional touch rejection (UTR) feature is provided. The impact sensor 104 and computing unit 106 can determine distinctly different characteristics of a touch event to verify a user-intended touch.

The touch controller 108 includes an unintentional touch rejection (UTR) gating function 110 configured with logic functions for determining whether to output a touch event report if the touch event is verified by the computing unit 106. It is noted that the diagram shown in FIG. 1 is a simplified block diagram of a UTR gating function to pass touch events and coordinates to the OS. Typical implementations may be implemented in firmware, not logic hardware. More particularly, the UTR gating function 110 may include a logic AND function 112 and a logic OR function 114 configured to receive inputs from a touch event manager 116 and the computing unit 106. These logical functions may be implemented via hardware logic and/or firmware algorithms. The touch manager 116 may receive, from the touch sensor 102, a signal indicating a touch event. In response to receipt of the signal, the touch event manager 116 outputs data indicating the touch event and coordinates to an input of the AND function 112.

Figure 2:
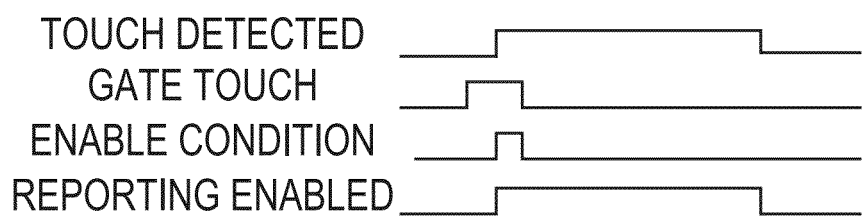
FIG. 2 is a graph of example inputs and a resulting output of an unintentional touch rejection (UTR) gating function in accordance with embodiments of the present invention.

For example, FIG. 2 illustrates a graph of example inputs and a resulting output of a UTR gating function in accordance with embodiments of the present invention. Referring to FIG. 2, the touch detected signal shows a scenario in which a touch event is detected and an active data signal is provided as input to the AND function 112. In this example, the touch controller controls data input, here represented by a logical high condition, to the AND function 112 in response to detection of a touch event. Thus, the AND function 112 requires simultaneous input of another logic high signal before a touch event can be passed through and reported to the operating system. The other high signal may be provided by suitable signaling of the computing unit 106 in response to verifying detection of user-intended touch. When detection by the touch controller 108 is complete, the touch controller 108 checks the status of the gate touch and if present, a touch event and coordinates are sent to the operating system. Once corroboration of a touch event from the gate touch signal is made, the touch controller 108 may control operations based exclusively on inputs from the touch sensor 102 until the display indicates that a touch is no longer detected, as indicated by the "REPORTING ENABLED" signal shown in FIG. 2. That is, once a touch is confirmed, gate touch input from the computing unit 106 is ignored for that specific touch event and inputs from the touch sensor 102 are used for additional coordinate inputs, such as during a "touch-and-drag" user input, until that specific touch is released, as detected by the touch sensor 102.

The computing unit 106 may receive a signal output from the impact sensor 104 and determine whether the signal meets predetermined criteria for verifying user-intended touch of the touch sensor 102. The gate touch output of the computing unit 106 is pulsed high when the computing unit 106 determines that the predetermined criteria are met. For example, referring to FIG. 2, the gate touch is pulsed before touch detection by the touch controller 108. Conversely, the gate touch output of the computing unit 106 is set low when the computing unit 106 determines that the predetermined criteria are not met. The output of the computing unit 106 is connected to an input of the OR function 114. The OR function 114 may also receive input from a UTR off function 118 for disabling the UTR function by the user via commands sent to the touch controller 108. Further, the OR function 114 may optionally receive input from a UTR enable line 120 for enabling the functionality of the UTR function when the computing unit 106 is physically present (to allow use of the controller in applications that do not have the impact detector). Finally, the OR function 114 may receive input from the output of the AND function 112 to maintain the output of the OS as long as there is data from the touch event manager 116.

Once verification is provided by a gate touch input from the computing unit 106, the output to the operating system may be wholly determined by the touch algorithms of the touch controller 108. That is, any additional outputs for change of coordinates would be reported as though the computing unit 106 was disabled until the touch is released as detected by the touch sensor 102. For example, the UTR function of the computing unit 106 is only intended to confirm a touch event, not to control the touch screen function after an initial touch contact. As should be appreciated, if a touch event is not confirmed by the gate touch status, a touch event detected by the touch controller is masked. Further, user input may control whether the UTR function of the computing unit 106 is enabled, and a control signal may be provided via the UTR enable line 120. In an example, the UTR function is disabled by default. As an example, FIG. 2. depicts a case where the UTR function is enabled, touch is detected and when the gate touch is high at the same time, a concurrent condition pulse goes high and enabling a resulting reporting enabled positive condition at the output of the AND function 112 when the conditions are met. While the reporting enabled pulse is high, touch event data and coordinates from the touch controller 108 are reported to the operating system. When the touch detection condition in FIG. 2 ends, the reporting enabled condition ends and all touch event and coordinate data is terminated for that particular event.

Criteria for detection of a user-intended touch may be selectively adjusted by a user. For example, the touch controller 108 may generate and output a control via sensitivity control signals Sen-A 122 and Sen-B 124. A user may input controls via a suitable user application running in a suitable operating system environment. As an example, the user may control threshold level that a received signal must meet.

A hold time of the gate touch pulse may be set such that the touch controller 108 is provided sufficient time to process data from the touch sensor 102 and to test for a concurrent event. In addition, the gate touch pulse hold time may be set such that its event is coincident with the event detected by the touch controller 108. In an example, the hold time may be between about 150 and 200 milliseconds, although any suitable hold time may be used depending on the time needed by the touch controller 108 to process signals.

Figure 3:
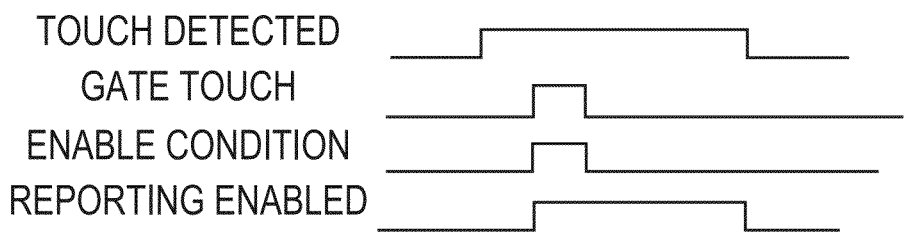
FIG. 3 is a graph of another example of inputs and a resulting output of a UTR gating function in accordance with embodiments of the present invention.

FIG. 3 illustrates a graph of another example of inputs and a resulting output of a UTR gating function in accordance with embodiments of the present invention. Referring to FIG. 3, the gate touch pulse is delayed relative to the touch detected condition that indicates a touch is detected by the touch controller 108. The touch event report may be held until the gate touch status is high, and then the touch controller 108 may receive control. As a result, a "hover" time may be provided to a user in which the user's finger or stylus are close enough to the display 101 to be detected by the touch sensor 102 but without physically touching and not causing detection by the impact sensor 104. This feature may allow movement to a target location before contact is made. In an example, this wait time may be set to about 10 seconds or another suitable time period. The wait time period may be set by a user by use of a suitable application.

Figure 4:
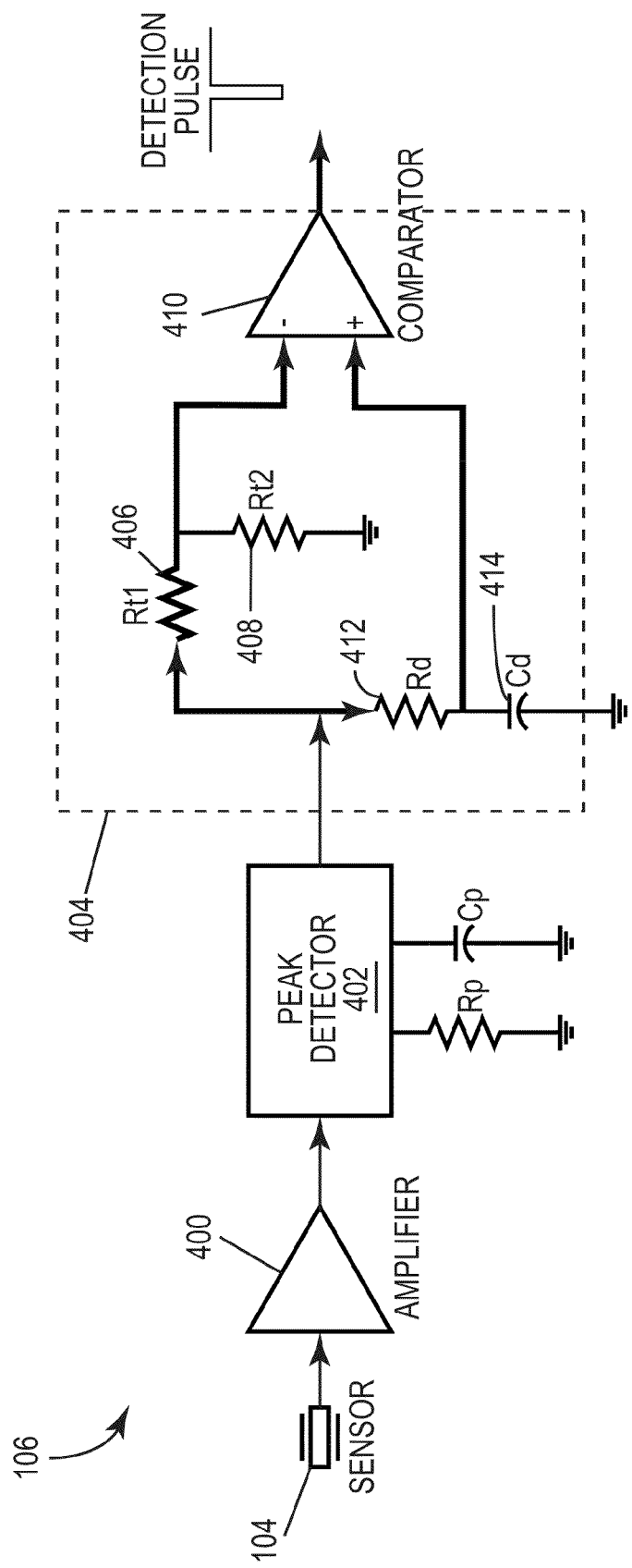
FIG. 4 is a block diagram of an impact sensor and components of a computing unit in accordance with embodiments of the present invention.

FIG. 4 illustrates a block diagram of the impact sensor 104 and components of the computing unit 106 in accordance with embodiments of the present invention. Referring to FIG. 4, the impact sensor 104 in this example is a piezoelectric sensor, which is in vibrational communication with a touch-sensitive display, such as the display 102. The impact sensor 104 is configured to generate a signal representative of the touch-sensitive display. An amplifier 400 may receive the generated signal, amplify the signal, and output the amplified signal to a peak detector 402. The sample and hold recovery time constant (value of the resistor Rp times the value of the capacitor Cp). The values may be configured such that the peak detector 402 filters background noise in the signal and allows sufficiently fast enough recovery to detect rapid multiple touches to the touch-sensitive display. The peak detector 402 recovery time may have a time constant of about 3.3 seconds or any other suitable time constant from less than 0.5 seconds to more than 10 seconds. Further, the sample and attack time constant (i.e., charging of capacitor Cp) can be set to be fast enough to follow the rise of the touch impact amplitude.

Figure 5:
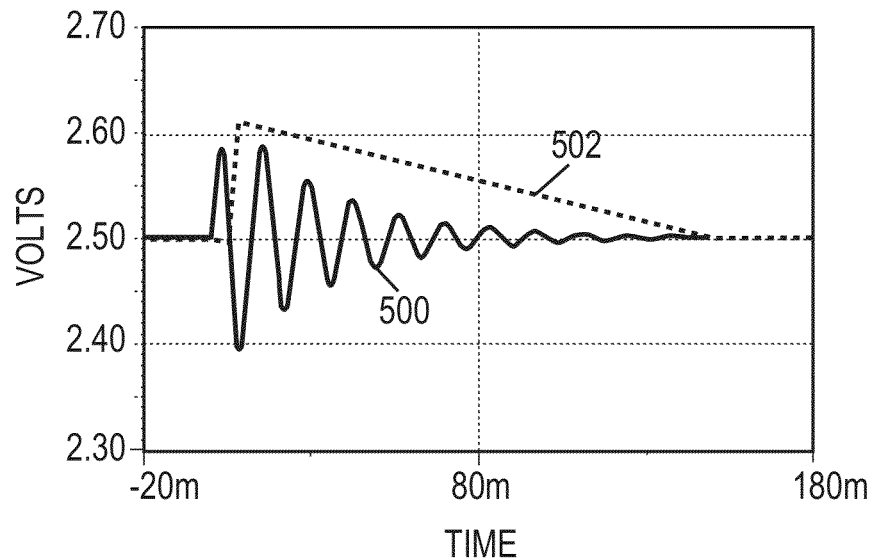
FIG. 5 is a graph showing example outputs of an amplifier and peak detector shown in FIG. 4 in accordance with embodiments of the present invention.

FIG. 5 illustrates a graph showing example outputs of the amplifier 400 and peak detector 402 shown in FIG. 4 in accordance with embodiments of the present invention. Referring to FIG. 5, line 500 shows the output of the amplifier 400 over time in response to receipt of user-intended touch signal of the touch sensor 102. As depicted, a user-intended touch causes a resonant response similar to a tuning fork, wherein the signal resonates at the natural frequency of the impact sensor 104 (such as 75 Hz) and whose amplitude goes from zero to a peak amplitude almost instantaneously and then decays over time. The presently disclosed subject matter may be used to recognize such characteristics of the signal even in noisy vibrational environments. Threshold sensitivity levels may be set by a user. The peak detector 402 can evaluate the shape of the signal amplitude, not simply its value. Line 502 shows the output of the peak detector 402 over time in response to receipt of the signal depicted by line 500.

The computing unit 106 includes a differential time delay detector 404 for detecting user-intended touch signals within a signal generated by the impact sensor 104. A signal output by the peak detector 402 is received by the detector 404 and electrically communicated to two pathways. In one pathway, the peak detector output signal 502 is communicated to a voltage divider including resistors Rt1 406 and Rt2 408. The voltage divider may generate an output that is a fraction of the peak detector output signal 502 and may communicate its output to a comparator 410. The voltage divider provides a threshold effect (Rt1, Rt2). In the other pathway, the peak detector output signal 502 is communicated to a low pass filter having a resistor Rd 412 and a capacitor Cd 414. The low pass filter is configured to receive the peak detector output signal 502 and to apply low pass filtering to the peak detector output signal 502. The low pass filter communicates its output signal to another input of the comparator 410. In this example, the comparator 410 is an operational amplifier. The comparator 410 can receive the signals from the voltage divider and the low pass filter as inputs and generate a trigger pulse in response to the output signal of the voltage divider being greater than the output signal of the low pass filter. More particularly, the comparator 410 detects when the rising edge of the triangular characteristic signal of a touch event is fast enough and larger than a preset threshold. In this way, the detector 404 may determine whether a rising edge and a magnitude of the peak detector output signal 502 meet predetermined criteria for determining a touch event. In an example, the low pass filter may have a time constant that is slow enough to detect the rising slope of the triangular waveform. In another example, the low pass filter may have a time constant of about 10 milliseconds, although it may alternatively be within a range between about 1 and 100 milliseconds.

Figure 6:
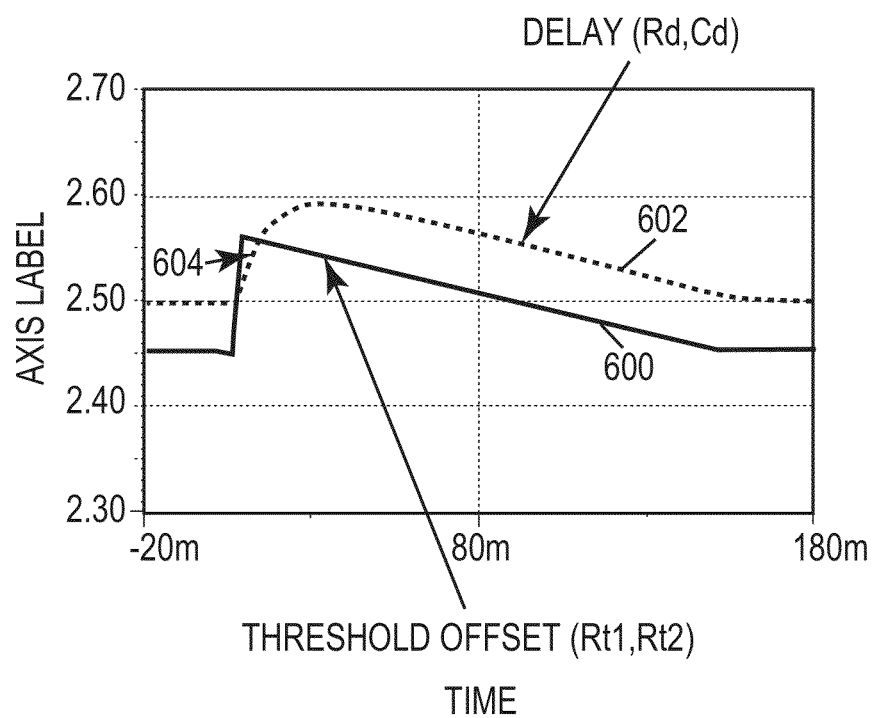
FIG. 6 is a graph showing example outputs of the voltage divider and low pass filter shown in FIG. 4 in accordance with embodiments of the present invention.

FIG. 6 illustrates a graph showing example outputs of the voltage divider and low pass filter shown in FIG. 4 in accordance with embodiments of the present invention. Referring to FIG. 6, line 600 shows the output of the voltage divider of the detector 404 in response to receipt of user-intended touch signal of the touch sensor 102. Line 602 shows the output of the low pass filter of the detector 404 in response to receipt of user-intended touch signal of the touch sensor 102. The comparator 410 compares the two signals and reports a user-intended touch event during the short interval, indicated generally by reference numeral 604, when the signal output by the voltage divider is greater than the signal output by the low pass filter.

Figure 7:
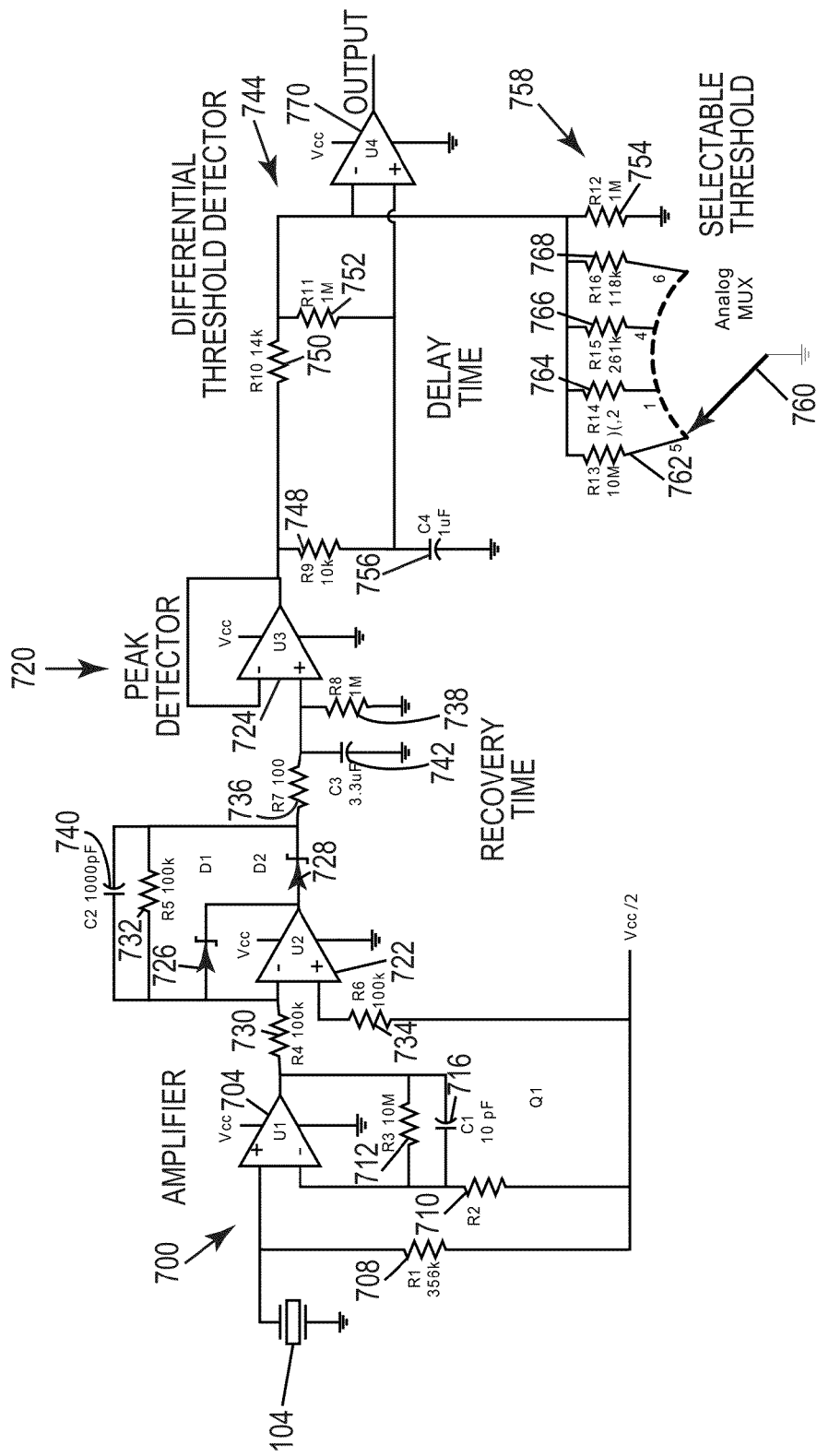
FIG. 7 is a schematic of an example unintentional touch rejection system including an impact sensor and a computing unit in accordance with embodiments of the present invention.

FIG. 7 illustrates a schematic diagram of an example unintentional touch rejection system including an impact sensor 104 and a computing unit 106 in accordance with embodiments of the present invention. Referring to FIG. 7, the impact sensor 104 may be attached to a touch-sensitive display and configured to generate a signal representative of impact to the display. The signal output by the impact sensor 104 may be output to an amplifier 700. The amplifier 700 includes an operational amplifier U1 704 configured with components for providing a gain to a signal input from the impact sensor 104. Particularly, the operational amplifier 704 is configured with resistors R1 708, R2 710, and R3 712, and a capacitor C1 716 having the shown resistor and capacitance values.

A precision peak detector 720 has an input connected to an output of the amplifier 700. The peak detector 720 includes operational amplifiers U1 722 and U2 724, Schottky-type diodes D1 726 and D2 728, resistors R4 730, R5 732, R6 734, R7 736, R8 738, and capacitors C2 740 and C3 742. The time constants determined by resistor R7 736, capacitor C3 742, and resistor R8 738 may determine time constants of the detector 720. The time constant of resistor R7 736 and capacitor C3 742 may be set to be sufficiently short to respond to the rapid rise time of the amplitude of an impulse signal resulting from user-intended touch. The time constant defined by resistor R8 738 and capacitor C3 742 may be set to be sufficiently long to filter background noise, but short enough to respond to multiple user-intended touches. As a result of such settings, the detector 720 may recover at about the same time as the time needed for the impulse signal 500 shown in FIG. 5 to completely decay as shown in the example of FIG. 5. It is noted that in the presence of noise, the amplitude of the detector 720 may rise to the same level as the noise amplitude, but respond equally to an impulse signal. It is also noted that there may be some "ripple" characteristics to the signal of the detector 720 that results from noise, but it is minimal.

The system of FIG. 7 includes a differential threshold detector 744 having an operational amplifier U4 770, resistors R9 748, R10 750, R11 752, and R12 754, and a capacitor C4 756. The detector 744 may also include a user selectable threshold component 758 having an analog multiplexer 760 and resistors R13 762, R14 764, R15 766, and R16 768 configured for user selection of a threshold level. The input to the detector 744 from the detector 720 is split into two paths: one to delay and average the signal, referred to as Vavg; and the other to offset the signal, Voff, by some threshold amount. The Vavg signal is determined by the resistor R9 748 and the capacitor C4 756 forming a low pass filter. The time constant of the low pass filter may be set such that it is fast enough to recover at the same rate or faster than the peak detector 720, but slow enough to provide some time differentiation from the input signal. The Voff signal may respond at the same rate as the peak detector 720. When there is a sudden increase in the amplitude of the peak detector 720, there may be a short time period when the Voff signal is greater than the Vavg signal, thus creating a negative pulse on an output of an operational amplifier U4 770, which functions as a comparator.

The analog multiplexer 760 may be controlled by input of a user for controlling the detection threshold level. For example, the user may enter a command for controlling the detection threshold level. In response to receipt of the command, control signals may be communicated via suitable lines, such as via signals Sen-A 122 and Sen-B 124 shown in FIG. 1. Such signals may be communicated to an input of the analog multiplexer 760 for controlling the detection threshold level.

Figure 8:
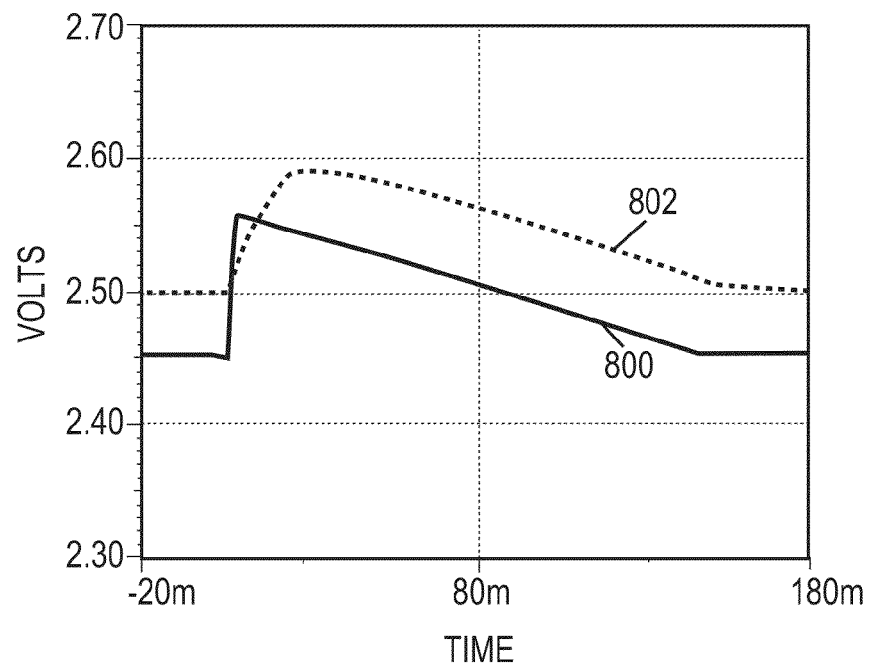
FIGS. 8 and 9 illustrate graphs of example signals when a user-intended touch event is detected in the presence of various conditions.
Figure 9:
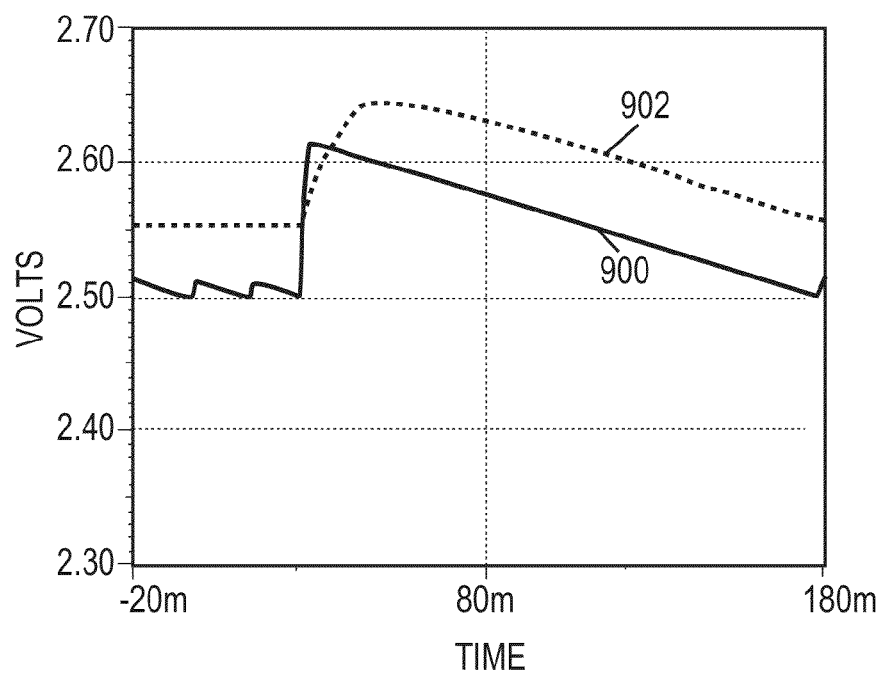

The timing difference between the two signals Voff and Vavg is depicted in FIGS. 8 and 9. FIG. 8 illustrates a graph of an example Voff signal 800 and Vavg signal 802 when a user-intended touch event is detected and in the presence of little noise. FIG. 9 illustrates a graph of an example Voff signal 900 and Vavg signal 902 when a user-intended touch event is detected and during a noisy condition. In FIG. 8, Vavg has a quiescent point of 2.5 volts in this case since there is no or little noise. The Voff is offset to a lower quiescent voltage by the threshold setting circuits, which include the resistors R10, R12, and R13-R16 shown in FIG. 7. The resistor R11 752 functions to maintain a reference to the Vavg signal. During the lag on the rise of the Voff signal, there is a short time period of time when it is higher than the Vavg signal. If the offset is increased, the impulse signal must be larger for the Voff signal to cross the threshold of the Vavg signal.

Referring to FIG. 9, noise present on an impact sensor causes the peak detector voltage to rise and the signals Vavg and Voff to rise correspondingly as shown. However, the delta is approximately the same, and an impulse can cause approximately the same delta rise between the signal Voff and the signal Vavg as in the case of no noise as shown in FIG. 9. As a result, noise may be made relatively insignificant to the performance.

In accordance with one or more other embodiments, an automatic gain control (AGC) feedback from the delay time (C4) Vavg signal to the input of the amplifier 700 may be provided for extending the operating range of vibration noise.

It is noted that FIG. 7 identifies specific component values such as resistor and capacitor values; however, the values of such components may be any other suitable value. For example, the component values may alternatively be any other suitable value for achieving functionality in accordance with embodiments of the present invention.

Figure 10:
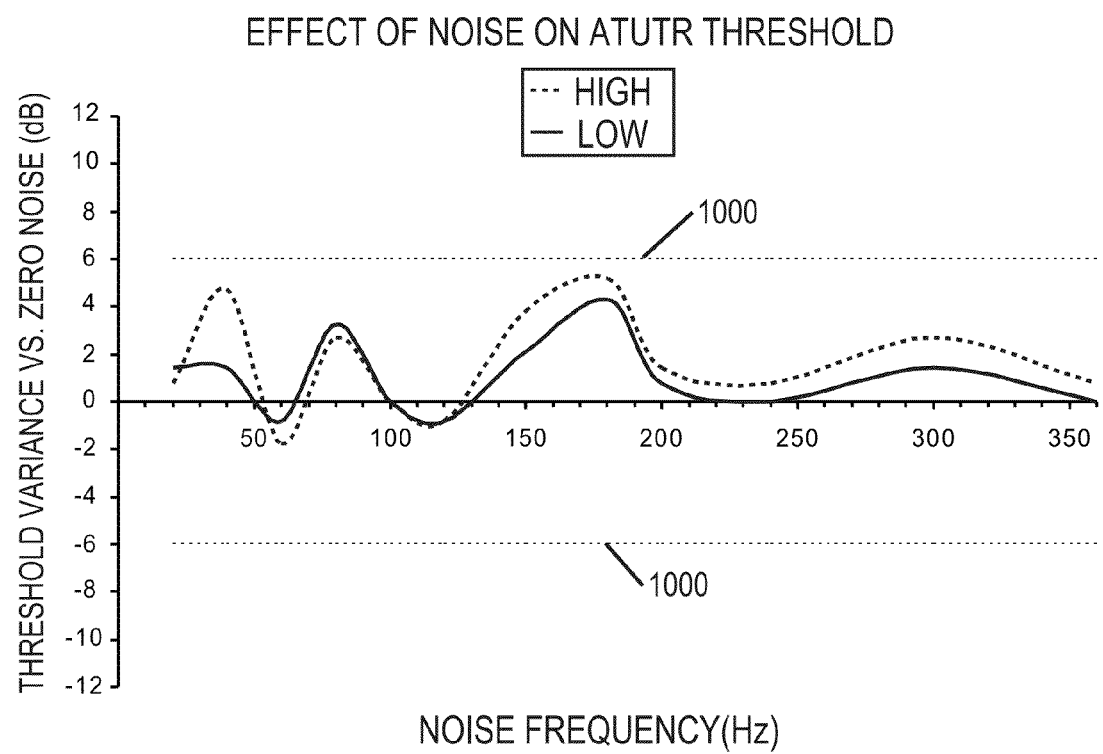
FIG. 10 illustrates a graph of the variation in the effective threshold levels caused by the noise in accordance with the experiment.

In an experiment, a differential threshold detector was simulated to determine the effects of background vibrational noise. Several noise frequencies were tested in the range from 20 Hz to 360 Hz at both relatively low noise levels and high noise levels. FIG. 10 illustrates a graph of the variation in the effective threshold levels caused by the noise in accordance with the experiment. The humanly detectable variance of +/− dB is shown by the dashed horizontal lines 1000 for reference. As shown, the variation in the effective threshold is below humanly detectable levels, and relatively the same independent of background noise (low or high).

Figure 11:
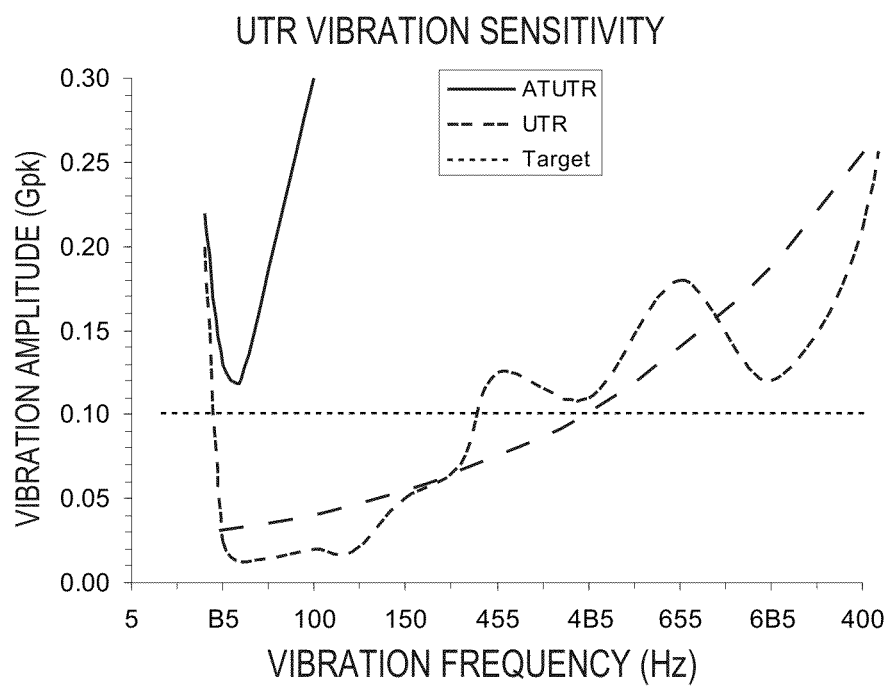
FIG. 11 shows a graph of vibration amplitude versus frequency for both systems.

Experiments were conducted to compare the sensitivity to noise for an unintentional touch detection system in accordance with embodiments of the present invention to a previous unintentional touch rejection system. The systems were set at a low threshold and the vibration level was adjusted until it was observed that touch was detected without actually touching a display screen. FIG. 11 shows a graph of vibration amplitude versus frequency for both systems (it is noted that higher may be better). The previous unit (designated as UTR) is shown in the graph to be very sensitive to noise in a broad range of frequencies. In contrast, the unit in accordance with the present invention (designated as ATUTR, for example) is shown to be more than an order of magnitude less sensitive.

Figure 12:
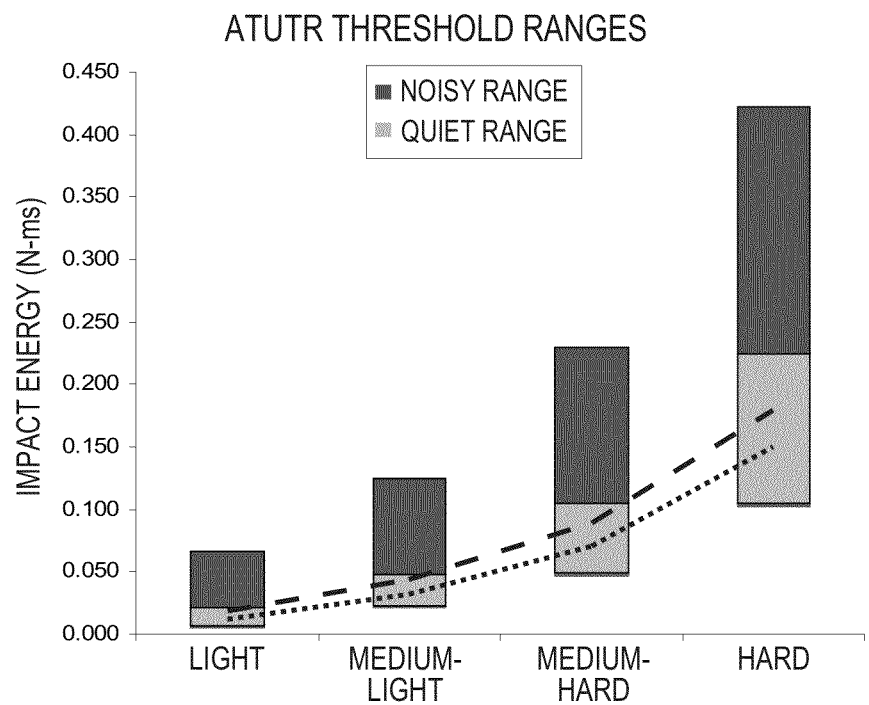
FIG. 12 illustrates a graph of impact energy versus different ranges.

With the effects that noise may have on the variances of the effective threshold, threshold limits may be expanded as shown in FIG. 12, which illustrates a graph of impact energy versus different ranges. It is noted that the variance increases upwardly, which is beneficial, and that the mean does not vary significantly between a quiet and noisy environment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A display device comprising:
    a touch-sensitive display;
    an impact sensor attached to the touch-sensitive display and configured to generate a signal representative of impacts to the touch-sensitive display; and
    a computing unit configured to:
        receive the signal;
        determine whether a predetermined fraction of the signal is greater than a low-pass filter output of the signal; and
        indicate detection of user-intended touch in response to determining that the predetermined fraction of the signal is greater than a low-pass filter output of the signal,
    wherein the computing unit is configured to detect a peak value of the signal, and
    wherein the computing unit comprises:
        a voltage divider configured to receive the peak detected signal and generate a first output that is a fraction of the peak detected signal;
        a low pass filter configured to receive the peak detected signal and to apply low-pass filtering to the peak detected signal to generate a second output; and
        a comparator configured to receive the first and second outputs as inputs and to generate a trigger pulse in response to the first output being greater than the second output to indicate detection of user-intended touch.

2. The display device of claim 1, wherein the impact sensor is a piezoelectric sensor.

3. The display device of claim 1, wherein the impact sensor is in vibrational communication with the touch-sensitive display.

4. The display device of claim 1, wherein the computing unit comprises a peak detector configured to filter background noise in the signal.

5. The display device of claim 1, wherein the predetermined fraction is defined by a voltage divider that is configured to receive the signal as input and to output the predetermined fraction of the signal.

6. The display device of claim 1, wherein the low pass filter has a time constant between about 1 and 100 milliseconds.

7. The display device of claim 1, wherein the voltage divider is configured to selectively adjust a magnitude of the first output to adjust a detection threshold level of detection of the user-intended touch.

8. The display device of claim 7, wherein the voltage divider is configured to receive user input for adjusting the detection threshold level.

9. The display device of claim 1, further comprising an amplifier configured to receive and amplify the signal from the impact sensor.

10. The display device of claim 1, further comprising a touch controller configured to:
    determine a touch event associated with the touch-sensitive display;
    determine a coordinate associated with the touch event;
    determine whether the touch event occurs when the predetermined criteria is met;
    in response to determining that the touch event occurs when the predetermined criteria is met, communicate the coordinate to a user interface manager.

11. The display device of claim 1, wherein the computing unit is configured to indicate that user-intended touch is not detected in response to determining that the predetermined fraction of the signal is not greater than the low-pass filter output of the signal.

12. A method comprising:
   generating a signal representative of an impact to a touch-sensitive display;
   determining whether a predetermined fraction of the signal is greater than a low-pass filter output of the signal;
   in response to determining that the predetermined fraction of the signal is greater than a low-pass filter output of the signal, indicating detection of user-intended touch;
   using a voltage divider to receive a peak detected signal and to generate a first output that is a fraction of the peak detected signal;
   using a low pass filter to receive the peak detected signal and to apply low-pass filtering to the peak detected signal to generate a second output; and
   generating an indication in response to the first output being greater than the second output to indicate detection of user-intended touch.

13. The method of claim 12, wherein generating the signal comprises using an impact sensor attached to the touch-sensitive display to generate the signal.

14. The method of claim 13, wherein the impact sensor is in vibrational communication with the touch-sensitive display.

15. The method of claim 12, further comprising filtering background noise in the signal.

16. The method of claim 15, wherein filtering background noise comprises using a peak detector with a recovery time constant between about 0.1 and 10 seconds.

17. The method of claim 12, wherein the low pass filter has a time constant between about 1 and 100 milliseconds.

18. The method of claim 12, further comprising selectively adjusting the voltage divider to adjust a magnitude of the first output to adjust a detection threshold level of detection of the user-intended touch.

19. The method of claim 12, receiving user input for adjusting the detection threshold level.

20. The method of claim 12, further comprising:
   receiving the signal from an impact sensor attached to the touch-sensitive display; and
   amplifying the signal from the impact sensor.

21. The method of claim 12, further comprising:
   determining a touch event associated with the touch-sensitive display;
   determining a coordinate associated with the touch event;
   determining whether the touch event occurs when the predetermined criteria is met;
   in response to determining that the touch event occurs when the predetermined criteria is met, communicating the coordinate to a user interface manager.

22. The method of claim 12, further comprising indicating that user-intended touch is not detected in response to determining that the predetermined fraction of the signal is not greater than the low-pass filter output of the signal.

* * * * *